(12) United States Patent
Rayer Rabindran et al.

(10) Patent No.: US 11,413,572 B2
(45) Date of Patent: Aug. 16, 2022

(54) METHODS AND SYSTEMS FOR EMISSIONS CONTROL IN SOLVENT-BASED CO2 CAPTURE PROCESSES USING CO2

(71) Applicant: Research Triangle Institute, Research Triangle Park, NC (US)

(72) Inventors: Aravind V. Rayer Rabindran, Morrisville, NC (US); Vijay Gupta, Cary, NC (US); Paul D. Mobley, Raleigh, NC (US); Jak Tanthana, Durham, NC (US); Shaojun Zhou, Cary, NC (US); Finn Andrew Tobiesen, Trondheim (NO); Thor Mejdell, Trondheim (NO); Andreas Grimstvedt, Trondheim (NO); Geir Haugen, Trondheim (NO)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 16/905,055

(22) Filed: Jun. 18, 2020

(65) Prior Publication Data
US 2020/0398216 A1 Dec. 24, 2020

Related U.S. Application Data

(60) Provisional application No. 62/863,021, filed on Jun. 18, 2019.

(51) Int. Cl.
*B01D 53/14* (2006.01)
*B01D 53/18* (2006.01)

(52) U.S. Cl.
CPC ..... *B01D 53/1475* (2013.01); *B01D 53/1406* (2013.01); *B01D 53/1425* (2013.01); *B01D 53/18* (2013.01); *B01D 2252/204* (2013.01)

(58) Field of Classification Search
None
See application file for complete search history.

(56) References Cited

U.S. PATENT DOCUMENTS 7,056,482 B2 * 6/2006 Hakka ................ B01D 53/1406
423/230
9,155,990 B2 10/2015 Graff et al.
(Continued)

OTHER PUBLICATIONS

Burau, R.G, et al.,"Soil and Water Chemistry", SSC 102 Course Notes & Graphical Materials, U.C. Davis Winter Quarter 2002 (1 page).

*Primary Examiner* — Daniel Berns
(74) *Attorney, Agent, or Firm* — Olive Law Group, PLLC; Nathan P. Letts

(57) ABSTRACT

A method with corresponding systems for reducing emission of amines to the atmosphere. The method includes a a) introducing a gas containing $CO_2$ into an absorber; b) flowing the flue gas through an absorber having an absorbent with a water-lean solution having less than 50% water and one or more amines, with the absorbent capturing the $CO_2$ and forming a reduced $CO_2$ content gas having a baseline $CO_2$ content; and c) washing the reduced $CO_2$ content gas in a wash column with a wash solution comprising carbonic acid formed by addition of gaseous $CO_2$ into the wash solution. In this method, the washing removes the amines from the reduced $CO_2$ content gas and produces a reduced amine content gas exiting from the wash column.

24 Claims, 12 Drawing Sheets

(56) References Cited

U.S. PATENT DOCUMENTS

| | | | |
|---|---|---|---|
| 9,707,510 B2 | 7/2017 | Lail et al. | |
| 9,839,875 B2 | 12/2017 | Lail et al. | |
| 10,065,148 B2 | 9/2018 | Lail et al. | |
| 2011/0308389 A1* | 12/2011 | Graff | B01D 53/1406 |
| | | | 95/166 |

* cited by examiner

METHODS AND SYSTEMS FOR EMISSIONS CONTROL IN SOLVENT-BASED CO2 CAPTURE PROCESSES USING CO2

CROSS REFERENCE TO RELATED APPLICATIONS

This application is related to and claims priority to U.S. Ser. No. 62/863,021 filed Jun. 18, 2019, entitled "METHODS AND SYSTEMS FOR EMISSIONS CONTROL IN SOLVENT-BASED $CO_2$ CAPTURE PROCESSES USING $CO_2$," the entire contents of which are incorporated herein by reference.

STATEMENT REGARDING FEDERALLY SPONSORED RESEARCH OR DEVELOPMENT

This invention was made with government support under DE-FE0026466 and DE-FE0031590 awarded by US Department of Energy. The government has certain rights in the invention.

BACKGROUND OF THE INVENTION

Field of Invention

The invention relates to solvent-based processes for post-combustion $CO_2$ capture.

Discussion of the Background

Solvent-based processes for post-combustion $CO_2$ capture involve contacting a flue gas with a $CO_2$ scrubbing solvent typically in an absorber column. The solvent absorbs $CO_2$ from the flue gas, and the flue-gas stream leaves the absorber column with a reduced $CO_2$ content. The flue gas also picks up some solvent in the form of vapors and aerosols that exit the gas absorber column. The solvent vapor in the exiting flue gas results from the equilibrium of the solvent with the flue gas based on the solvent's vapor pressure. The solvent present in aerosols in the absorber column results from the solvent that is absorbed into the aerosols that are present, generated and/or grow in the flue gas during this process. To reduce the emissions from the carbon capture operations, and to reduce the solvent lost to the atmosphere, the entrained solvent needs to be recovered.

The treated flue gas, with the solvent vapors, is generally scrubbed in a water wash column to reduce the solvent emissions and solvent loss. In some cases, there may be an acid wash after the water wash for deeper removal to further reduce solvent emissions. After cleanup, the treated gas is sent to the vent. The condensed water from the water wash along with captured amine is returned to the absorber for recycle of the solvent. The solvent from the acid wash contains salts resulting from the neutralization of the solvent with the acid and is sent for waste treatment.

A schematic of a conventional post combustion $CO_2$ capture process with water wash is shown in FIG. 1. U.S. Pat. No. 9,155,990 (the entire contents of which are incorporated herein by reference) describes a conventional process. In this process and with reference to FIG. 1, exhaust gas from combustion of carbonaceous fuel enters the $CO_2$ capturing plant through line 101. Prior to the $CO_2$ capture plant, the flue gas will typically be treated by conventional air pollution control devices such as electrostatic precipitators (ESP), Flue Gas Desulfurisation (FGD) and Selective Catalytic NOx Reduction (SCR) units to control the emission of particles, SOx and NOx. The temperature of the exhaust gas is regulated by a direct contact cooler (DCC) which saturates the exhaust gas with moisture and lowers the gas temperature to 20-50° C.

The temperature of the exhaust entering the $CO_2$ capture plant is normally from about 25° C. to about 40° C. The exhaust gas (entering through line 101) is introduced into the lower part of a $CO_2$ absorber in which the exhaust gas flows from the bottom to the top of the absorber countercurrent to a lean liquid absorbent, i.e. a liquid absorbent that absorbs $CO_2$, and that is introduced into the upper part of the absorber through lean absorbent line 108. $CO_2$ lean gas, i.e. absorber exhaust gas where a substantial part of the $CO_2$ is removed, is removed through the top of the absorber (stream 102) and enters a water wash section where vapors of the absorbent are removed by the circulating water in the wash section. The low-$CO_2$ treated gas (stream 103) containing a trace amount of the absorbent is then released to a vent. Rich absorbent, i.e. absorbent having absorbed the majority of the $CO_2$, is removed from the absorber through a rich absorbent line 104 at the bottom of the absorber.

The rich absorbent is routed and is heated against lean absorbent that is returned to the absorption tower in a heat exchanger, to a temperature typically in the range between 90 and 110° C., before the rich absorbent (in line 105) is introduced into a regenerator column. In the regenerator column, the rich absorbent flows downwards, countercurrent to steam generated by heating some of the absorbent in a regeneration reboiler. Lean absorbent leaves the regenerator at the base of the regenerator column in line 106. The lean absorbent is introduced into a regeneration reboiler via line 106, where the lean absorbent is heated to a temperature typically in the range between 110 and 130° C., to further remove $CO_2$ from the hot absorbent and produce a vapor stream comprising $CO_2$ and water, which is entered into the regenerator in line 112.

The lean absorbent is drawn from the reboiler (in line 107) and recycled back to the absorber (via line 108). $CO_2$ released from the absorbent, water vapor and minor amounts of absorbent, are withdrawn from the regenerator through a gas withdrawal line (line 109) at the top of the regenerator. The gas in the gas withdrawal line 109 is cooled in a condenser to condense water and minor amount of absorbents from the remaining gas, mainly comprising $CO_2$. $CO_2$ gas and some remaining water vapor is removed from the $CO_2$ separator for further treatment, such as drying, compression, and sequestration or for utilization in another process (via line 110). The condensed water in the $CO_2$ separator is withdrawn (via line 111) and pumped back to the top of the regenerator.

Typical solvents used for $CO_2$ removal are aqueous solutions of amines (such as monoethanolamine (MEA), diethanolamine (DEA), methyldiethanolamine (MDEA), 2-amino 1-propanol (AMP)) or blends of amines. These solvents are subject to emission regulation, which involves (as shown in FIG. 1) a water wash. In some cases, the water wash is followed by an acid wash. Typical solutions used for acid wash include sulfuric acid, phosphoric acid etc.

SUMMARY OF THE INVENTION

In one embodiment, there is provided a method for reducing emission of amines to the atmosphere. The method comprises a) introducing a gas containing $CO_2$ into an absorber; b) flowing the gas through an absorber having an absorbent comprising a water-lean solution having less than 50% water and one or more amines, with the absorbent capturing the $CO_2$ and forming a reduced $CO_2$ content gas having a baseline $CO_2$ content; and c) washing the reduced $CO_2$ content gas in a wash column with a wash solution comprising carbonic acid formed by addition of gaseous $CO_2$ into the wash solution. The washing a) removes the amines from the reduced $CO_2$ content gas and b) produces a reduced amine content gas exiting from the wash column.

In one embodiment, there is provided a system configured to implement the method described above.

It is to be understood that both the foregoing general description of the invention and the following detailed description are exemplary, but are not restrictive of the invention.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
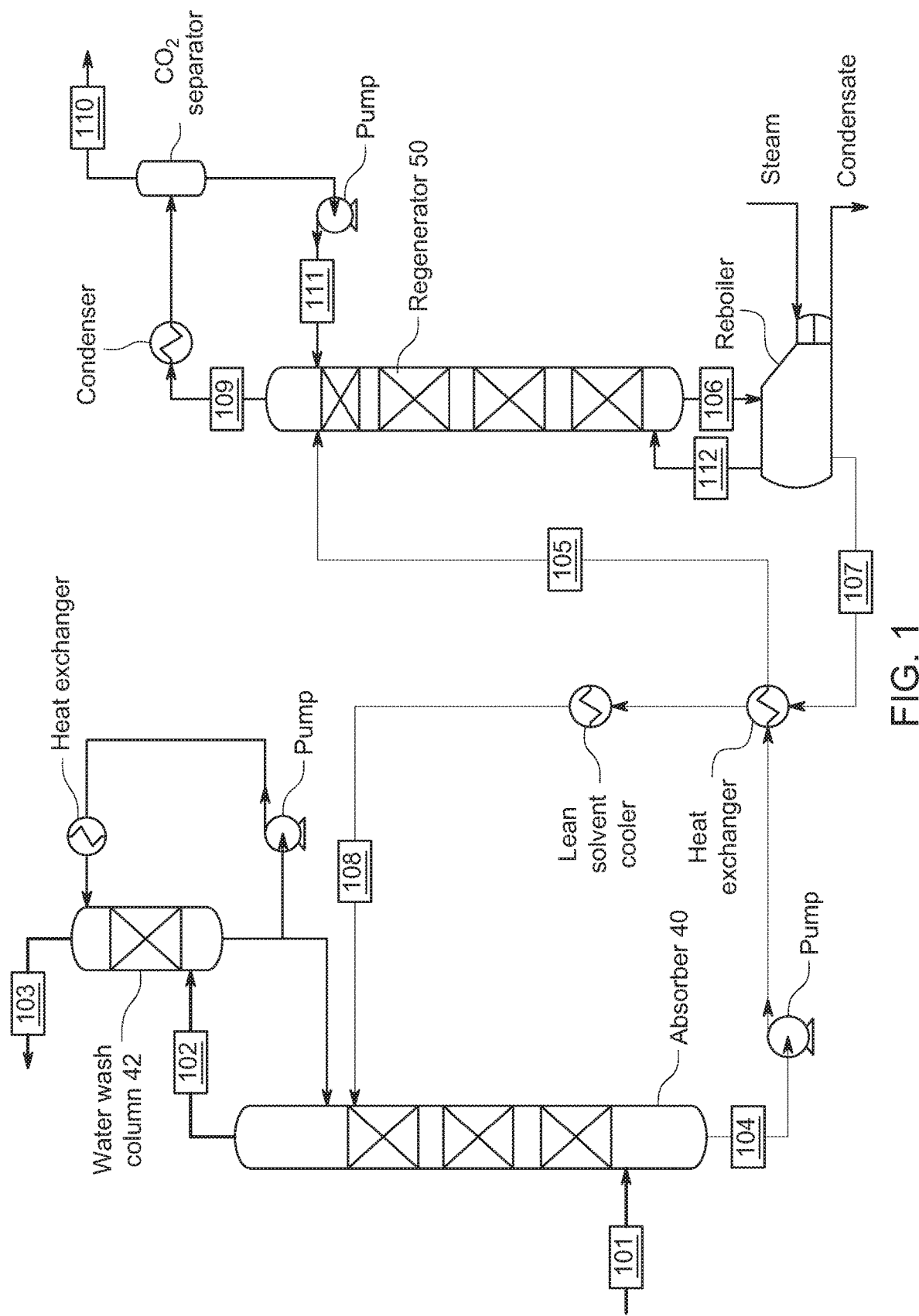
FIG. 1 is a schematic of a $CO_2$ capture system with a water wash.

The conventional practice is to use the built-in water wash sections in the absorber followed by an external acid wash column. In the acid wash column, the residual amines react with the acid to form acid-base salts that remain in solution, thus scrubbing the amine vapors from the treated gas and reducing the emissions. These acid-base salts are non-regenerable, and the solvent from the acid wash treatment is sent for waste treatment and disposal. One way to increase the effectiveness of the water wash is to decrease the pH of the water wash. However, in the conventional practice, solvent from the acid wash cannot be recycled to the absorber and leads to solvent losses.

One advantage of the present invention is that it can enhance the scrubbing efficiency of the water wash sections, thereby reducing the amine fugitive emission as well as any waste produced from the acid wash column. The relatively simple methods of the present invention to acidify water in the wash section should lead to significant cost-saving by reducing the size of the acid wash unit and lower waste treatment cost, and in one embodiment eliminating the need for an acid wash.

In one embodiment of this invention, a $CO_2$ stream is used to reduce the pH of the wash water, thus enhancing the effectiveness of the water wash step. This novel process is counter-intuitive since the treated flue gas often contains 1-2% $CO_2$ and further addition of the $CO_2$ would not be expected to have a significant impact.

However, based on experiments by the inventors, the addition of a more concentrated $CO_2$ stream provides a higher partial pressure that results in an effective reduction of the pH of the wash water by the formation of carbonic acid, leading to reduced solvent emissions. In multiple embodiments of the invention, any excess $CO_2$ in the water beyond that necessary for the carbonic acid to react with the amines is recoverable, and will not be emitted with the treated flue gas.

Experimental Results

Experiment 1: 100% $CO_2$ Bubbled in Wash Sump

A gas absorption system (GAS) in one embodiment of the invention contains a gas absorption column, a regenerator column, and a water wash column, along with the heat transfer units such as intercoolers, lean/rich heat exchanger and amine coolers. The flue gas enters the absorption column, flows counter currently to the solvent, and enters a wash column where it is scrubbed free of the solvent vapors before being vented out. The GAS in one embodiment of the invention is operated with a water lean solvent as the $CO_2$ scrubbing solvent. Various water-lean and potentially non-aqueous solvents, including amine-based solvents, suitable for this invention are described in the following U.S. Pat. Nos. 9,707,510, 9,839,875, and U.S. Ser. No. 10/065,148, the contents of each of which are incorporated herein in their entirety.

To control the amine concentration into the wash section, in one embodiment of the invention, the GAS was set up to flow a simulated flue gas containing 1.5% $CO_2$ through the absorber, with the absorber and regenerator all isothermal so no $CO_2$ absorption occurred once the solvent was at equilibrium. This permits the gas exiting the absorber to simulate a normal absorber effluent with the amount of amine in the effluent controlled by the temperature of the absorber.

In this experiment, about 300 standard liters per minute (SLPM) of simulated flue gas (1.5% $CO_2$, balance air) was fed to the absorber in which the flue gas picked up amine from the solvent and was fed to the wash column. The gas out of the absorber and the wash column were measured by a Fourier transform infrared spectroscopy multi-gas analyzer calibrated to measure amine concentrations in the range of 0-2000 ppm. Samples of the wash water were taken periodically from the wash column and analyzed for pH.

Figure 2:
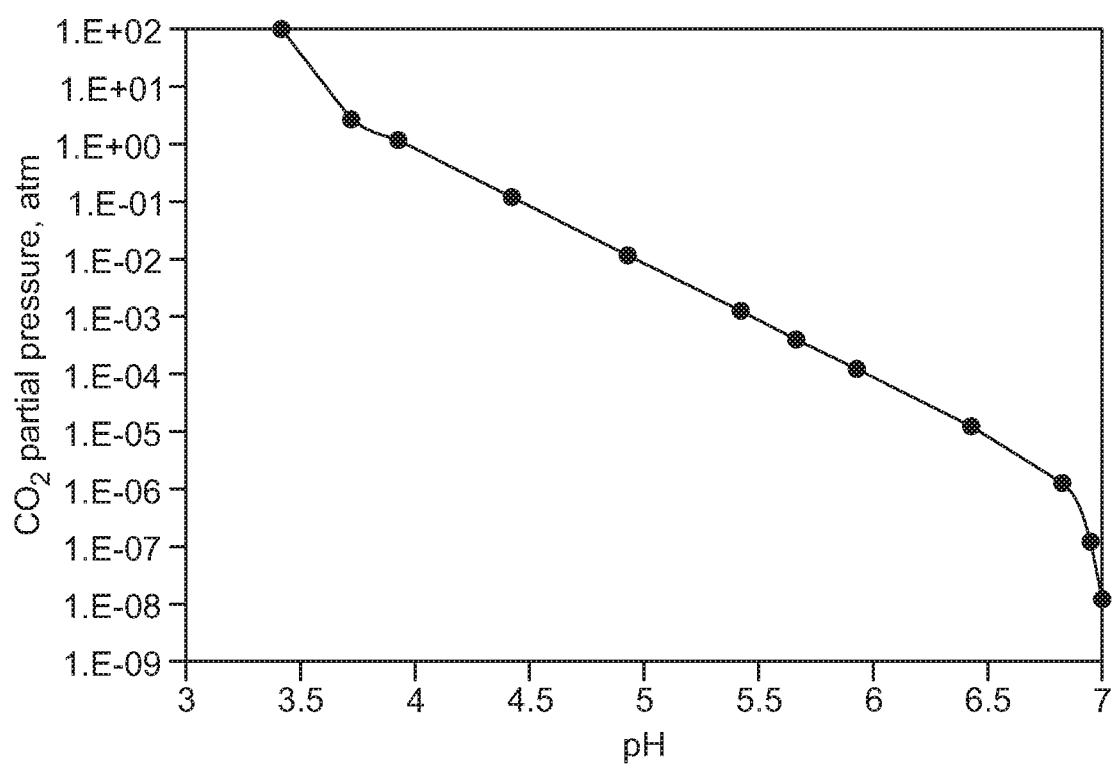
FIG. 2 is a schematic of the equilibrium pH of water and different pressures of $CO_2$ as carbonic acid concentration increases.

For reference as to how the concentration of carbonic acid changes, the equilibrium pH of water and different pressures of $CO_2$ are included below in FIG. 2 (showing the results as in Soil and Water Chemistry, SSC102 Course Notes & Graphical materials, U.C. Davis Winter Quarter 2002. Burau, R. G., Zasoski, R. J.). FIG. 2 shows that, as the partial pressure of $CO_2$ increases, the pH of the solution drops, making it more acidic. In one embodiment of the invention, bubbling $CO_2$ into the water stream in the water wash causes the partial pressure of the $CO_2$ in the water to increase, causing the water to become acidic which starts buffering the amine with a higher basicity.

For comparison, the wash column was operated in two modes (a) only the flue gas from the absorber is sent to the wash column, and (b) in addition to the flue gas stream, a $CO_2$ stream was also bubbled into the bottom of the wash column. The results are in Table 1 below, which shows that for both cases with a $CO_2$ stream added to the wash stream a remarkable reduction in amine concentration out of the wash was observed with a concomitant lowering of the pH.

TABLE 1

| 100% $CO_2$ flow-rate bubbled in (SLPM) | Absorber Temp (° C.) | Amine Out Absorber (ppm) | Water wash T (° C.) | Amine Out wash column (ppm) | pH |
|---|---|---|---|---|---|
| 0 | 30 | 311 | 33 | 73 | 8.3 |
| 2.2 | 30 | 311 | 33 | 33 | 7.5 |
| 0 | 20 | 37 | 20 | 18 | 8.2 |
| 2.2 | 20 | 37 | 20 | 11 | 7.1 |

Experiment 2: Synthetic Flue Gas (12.5% $CO_2$) Bubbled in Wash Sump

In this experiment, a blend of $CO_2$ and $N_2$ (12.5% $CO_2$, 87.5% $N_2$) was bubbled into the water in the sump or base of the wash column before the water was fed to the top of the column. Data on emissions and pH were recorded with and without the $CO_2$—$N_2$ blend input into the wash column. The results are in Table 2 below which also shows a remarkable reduction in amine concentration out of the wash column and a concomitant lowering of the pH.

TABLE 2

| 12.% $CO_2$-87.5% $N_2$ flow-rate (SLPM) | Absorber Temp (° C.) | Amine Out Absorber (ppm) | Water wash T (° C.) | Amine Out wash column (ppm) | pH |
|---|---|---|---|---|---|
| 0 | 20 | 40 | 20 | 21 | 8.3 |
| 2.2 | 20 | 45 | 20 | 6 | 7.4 |

It is evident from these experiments that bubbling $CO_2$ through the wash column, at either 100% $CO_2$ or 12.5% $CO_2$, results in acidification of the wash water with an accompanying reduction in the amine concentrations out of the wash column. Addition of the $CO_2$ stream (at 12.5% and 100% $CO_2$ concentrations) increases the partial pressure of the $CO_2$ in the wash water in the sump from 0.0015 MPa to 0.0125 and 0.1 MPa, respectively. This increased partial pressure results in acidification of the wash water, which is evident by the decreasing in pH of the wash water, before acidified water is pumped to the top of the wash column for reduction of the amines leaving the treated flue gas.

To show that the higher partial pressure of the $CO_2$ in the wash column was responsible for the effective removal of the amines, in Experiment 3 an equivalent amount of $CO_2$ as in the Experiment 1 was added to the flue gas to the absorber. 6.7 SLPM of $CO_2$ (1.5%*300+2.2) with a total flow-rate of 300 SLPM, was fed to the absorber. At these conditions, there was no change in the amine concentrations out of the wash water. This confirms that adding the $CO_2$ at higher concentrations in the wash water is the reason for the more effective wash in reducing the amine emissions, while adding the same flow rate of $CO_2$ to the flue gas, which effectively dilutes the $CO_2$ concentration (0.0022 MPa partial pressure), relative to adding the $CO_2$ directly into the sump, shows no impact.

Experiment 4 also replicated the setup of Experiment 1 but replaced the $CO_2$ stream with an equivalent flow of $N_2$. With $N_2$, there was no reduction in the amine content out of the wash column, thus confirming that the reduction of amine concentration is due to the chemical nature of the $CO_2$ gas, and not the hydrodynamics.

Figure 3:
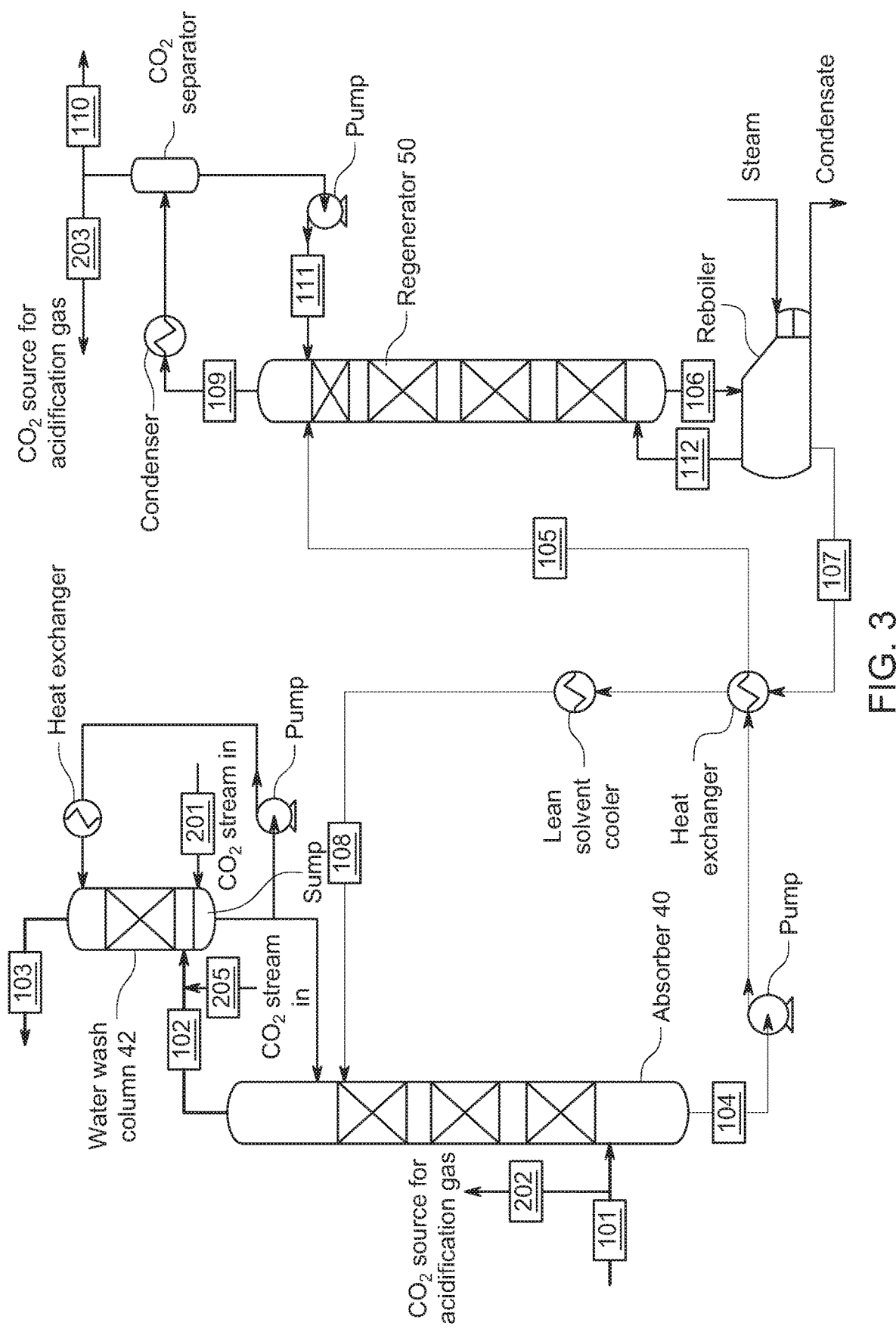
FIG. 3 is a schematic of a $CO_2$ capture system with $CO_2$ gas addition to a sump of a water wash for acidification of the water wash.

FIG. 3 shows an implementation of a wash section representative of the one used in these experiments. Experiment 1, 2, and 4 added $CO_2$ gas at input 201, where the gas would bubble up through the wash sump (i.e., the water contained at the bottom of the water wash column). The acidified water would be pumped to the top of the water column where along the way the water would pass through a heat exchanger controlling the temperature of the water entering the top of the column. The temperature of the acidified water entering the top of the column was controlled in these experiments to be between 20 and 45° C. Experiment 3 added $CO_2$ to the gas feed at input 205 in which the gaseous $CO_2$ by-passed the water sump. The above experiments by the inventors provide evidence of the efficacy of using a gaseous $CO_2$ stream to acidify the wash column for emissions control and for recovery of solvent. This can also be achieved through several different system and process configurations detailed below and modifications thereof.

Figure 4:
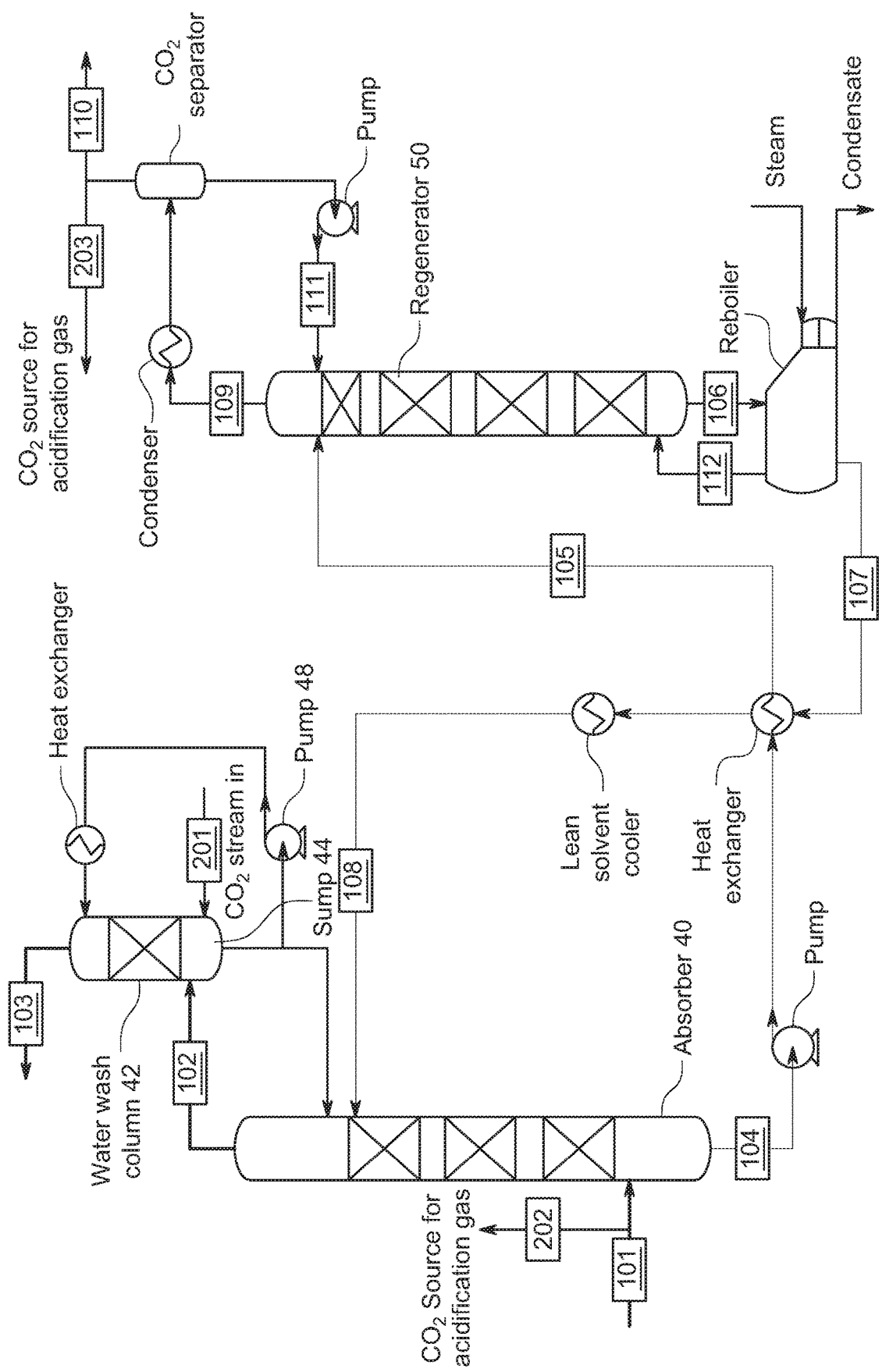
FIG. 4 is a schematic of another $CO_2$ capture system of the invention.

FIG. 4 is a schematic of a generic $CO_2$ capture system. This system is designed to reduce emission of amines to the atmosphere. The system has a gas feed 101 configured to supply gas containing $CO_2$, and an absorber 40 configured to receive the gas containing $CO_2$, and an absorbent supply 104 for provision of an absorbent to the absorber. The absorbent typically comprises a water-lean solution having less than 50% water and one or more amines, and the absorbent is configured to capture the $CO_2$ and form a reduced $CO_2$ content gas having a baseline $CO_2$ content.

The system as shown in FIG. 4 has a wash column 42 configured to wash with a wash solution the reduced $CO_2$ content gas flowing therethrough. The system as shown in FIG. 4 has a gaseous $CO_2$ supply 201 for provision of gaseous $CO_2$ into the wash solution. The wash solution comprises carbonic acid formed by addition of the gaseous $CO_2$ into the wash solution. Washing of the reduced $CO_2$ content gas a) removes the amines from the reduced $CO_2$ content gas and b) produces a reduced amine content gas which exits from the wash column. In FIG. 4, wash column 42 comprises a sump 44 from which the wash solution is pumped (by pump 40) the to the top of the wash column 42. The gaseous $CO_2$ supply 201 adds the gaseous $CO_2$ into the wash solution in the sump 44.

In one embodiment of the invention, the sump 44 in FIGS. 3 and 4 could itself be considered an acidification zone to which is introduced the gaseous $CO_2$ stream at the bottom of the column. Portion of the water from wash column 42 (in sump 44) is acidified by the $CO_2$ stream entering the bottom of the column. The acidified water is then pumped by pump 48 to the top of the water wash column 42. The acidified water may be re-pumped back to the top of the wash water column. Excess $CO_2$ which does not remain in the water wash in sump 44 can exit from the top of the column. In FIG. 4, the source of the gaseous $CO_2$ stream at supply 201 can be the inlet flue gas slipstream (stream 202) and after leaving the acidification zone column above the water level in sump 44, it is recombined with the flue gas stream via stream 204.

Accordingly, in one embodiment of the invention, that part of the $CO_2$ stream that is used for acidification of the water wash via supply 201 and which is not dissolved in the water in sump 44 can combine in the water wash column 42 with the flue gas that is being scrubbed, and the combined stream can exit the water wash column 42. In such a case, to maintain the overall $CO_2$ capture rate, an additional amount of $CO_2$ may need to be captured. For the case in Experiment 1, the 2.2 SLPM of $CO_2$ added to the water wash would correspond to an additional 5% $CO_2$ capture.

The system as shown in FIG. 4 has a regenerator 50 configured to regenerate the absorbent (details provided below). As shown in FIG. 4, the regenerator has a $CO_2$ outlet 109, and the $CO_2$ outlet 109 is coupled to the gaseous $CO_2$ supply 201 of the wash column via coupling 203. As shown in FIG. 4, the absorber 40 has a $CO_2$ tap 202 for tapping into the gas feed 101. In one embodiment of the invention, the $CO_2$ tap 202 is coupled to the gaseous $CO_2$ supply 201 of the wash column 42. FIG. 4 also shows a $CO_2$ stream being introduced into the wash column (via line 201). Potential sources for this stream could be a slipstream of the inlet flue gas stream for treatment (via line 202) and the $CO_2$ stream from the regenerator (line 203). Accordingly, in one embodiment of the invention, the source of the $CO_2$ for acidification of the water in sump 44 can be the concentrated $CO_2$ stream out of a regenerator (such as the regenerators shown in FIGS. 3-5). In another embodiment of the invention, a slipstream of the coal flue gas (with $CO_2$ in the range of 10-15%) or natural gas flue gas (with $CO_2$ in the range of 4-6%) can be used as the gaseous $CO_2$ supply for the water wash acidification.

Figure 5:
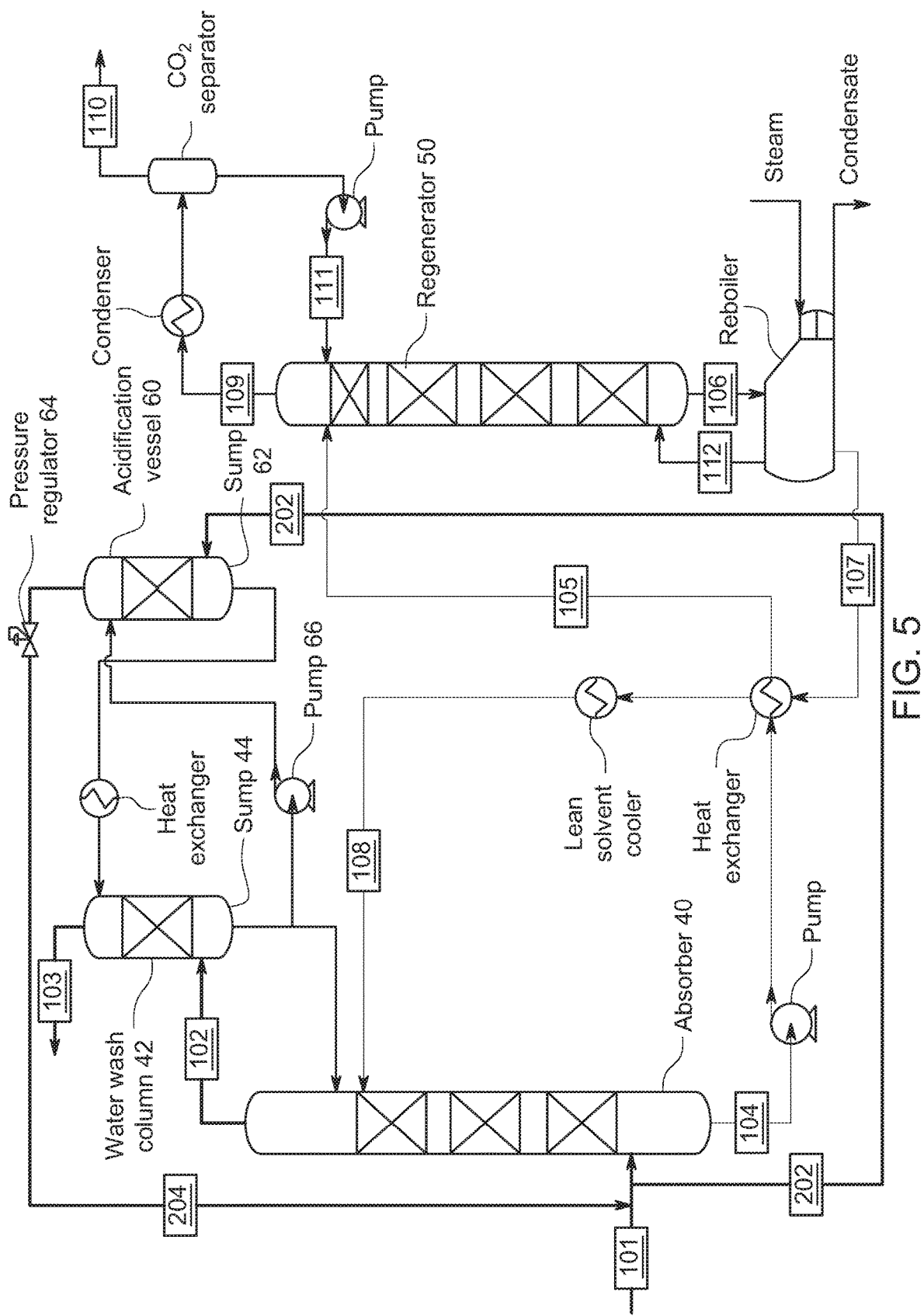
FIG. 5 is a schematic of yet another $CO_2$ capture system of the invention.

FIG. 5 shows a modified arrangement of FIGS. 3 and 4 that allows for adding the $CO_2$ at a higher pressure to achieve a lower pH with more $CO_2$ acidification. Here, the gaseous $CO_2$ is introduced into acidification vessel 60 having a sump 62 that is separate from the sump 46 in the wash column 42. Acidification vessel 60 is provided the gaseous $CO_2$ by line 202 connected to the gaseous $CO_2$ input line 101. Moreover, by way of regulator 64, any excess amount of gas not absorbed in sump 62 can be fed through line 204 back to the absorber 40, and regulator 64 effectively maintains a backpressure over sump 62 to enhance water absorption of $CO_2$ from the head pressure. In one embodiment of the invention, the configuration in FIG. 5 enhances the pH-reduction of the wash water by operating the acidification vessel 60 at higher pressures. $CO_2$, in excess of the amount required for acidification exits the acidification vessel 60 and can be re-captured. In the case where gaseous $CO_2$ for acidification of a water wash is a pure $CO_2$ stream of gaseous $CO_2$ from the regenerator, any excess can be re-captured for compression and storage.

As shown in FIG. 5, a pump 66 downstream from the sump 62 pumps water from sump 44 under pressure through acidification vessel 60 (and through the heat exchanger shown) into the top of the wash column 42. Accordingly, acidified water from acidification vessel 60 is pumped to the top of the wash column 42. In one embodiment, the gaseous $CO_2$ supply (for example by regulator 64) adds the gaseous $CO_2$ into the acidification vessel at a rate that the $CO_2$ is absorbed in the wash solution. In one embodiment, the gaseous $CO_2$ supply adds the gaseous $CO_2$ into the wash solution after removal from the wash column sump 44. The source of the $CO_2$ stream can be the $CO_2$ gas from the supply to the absorber, or (shown in FIG. 6) could be the $CO_2$ gas exiting the regenerator 50.

Accordingly, the system as shown in FIG. 5 has an acidification vessel 60 from which a wash solution is pumped to a top of the wash column 42. The gaseous $CO_2$ supply 202 from the supply to the absorber adds gaseous $CO_2$ into the wash solution in sump 62 of the acidification vessel 60. Viewed differently, the acidification vessel 60 is connected to the wash column 42 for acidification of a wash solution pumped from wash column 42 and for production in acidification vessel 60 of an acidified wash solution to be supplied to wash column 42. The acidified wash solution in this embodiment is provided to the wash column 42 to react with the amines in the reduced $CO_2$ content gas flowing through the wash column 42. Additionally, the sections in the water wash column 42 and the acidification vessel 60 can have packing (designated by the cross hatching) which provides a large surface area for mass transfer of the $CO_2$ into the wash solution, so the $CO_2$ is not necessarily absorbed solely in the sump.

Figure 6:
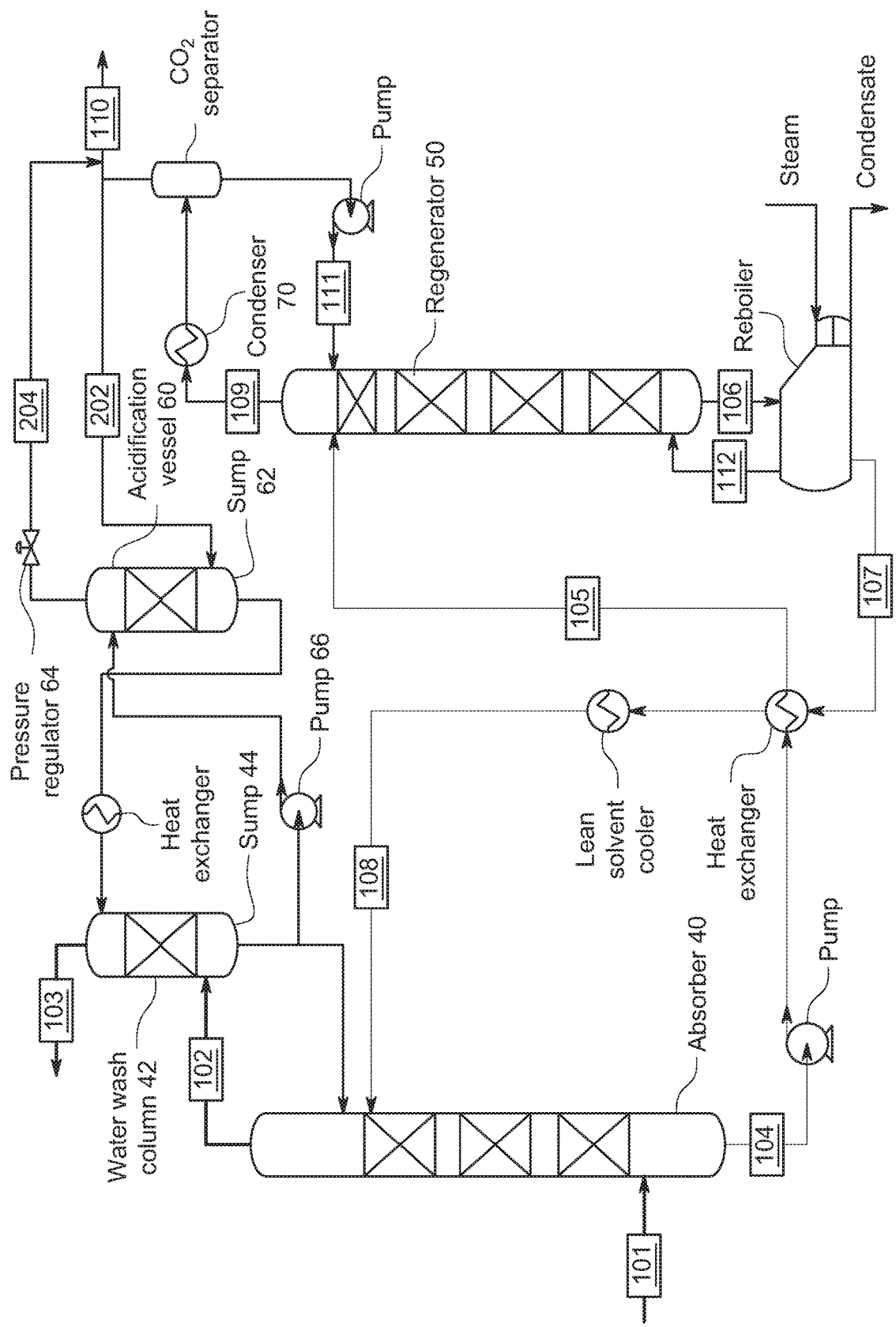
FIG. 6 is a schematic of still another $CO_2$ capture system of the invention.

FIG. 6 shows an embodiment where the gaseous $CO_2$ from the regenerator is feed to the acidification vessel 60. In FIG. 6, recycled $CO_2$ gas from regenerator 50 can be supplied directly to sump 62. Here, pressure regulator 64 can maintain an over-pressure adding pressure on top of sump 62 in the acidification vessel 60. In one embodiment of the invention, the pressure on top of the sump ranges 0.01-1.1 MPa, or 0.03-0.6 MPa, 0.04-0.4 MP, or 0.05-0.2 MPa. $CO_2$ absorbed in the wash solution in sump 62 makes an acidified wash solution. As above, the acidified wash solution in this embodiment is provided to the wash column 42 to react with the amines in the reduced $CO_2$ content gas flowing through the wash column 42.

Figure 7:
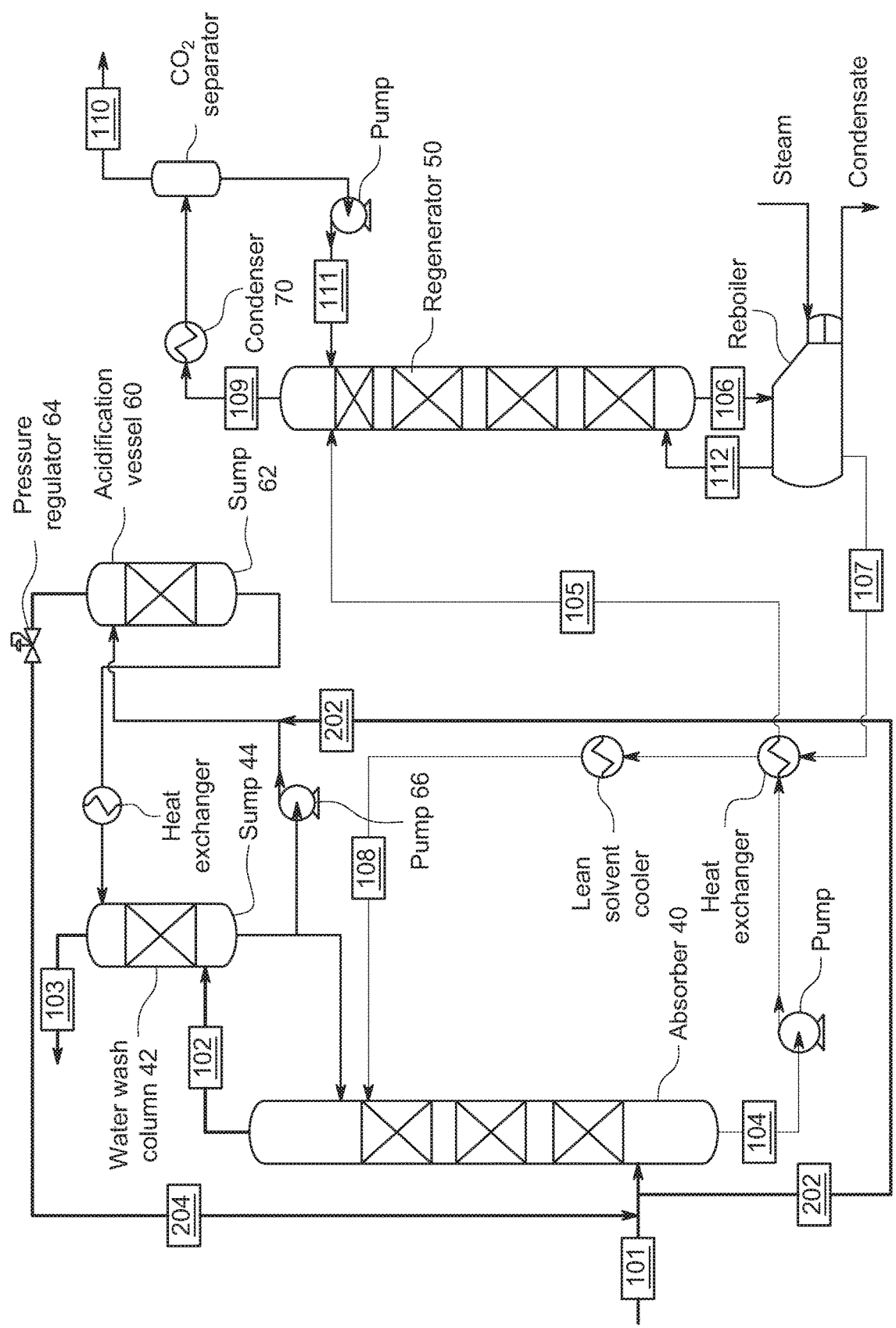
FIG. 7 is a schematic of one variant of the $CO_2$ capture system of the invention.

FIG. 7 shows an embodiment where the gaseous $CO_2$ from the flue gas supply 101 is feed to the acidification vessel 60 with addition into the pumped line from pump 66. Here, line 202 from flue gas supply 101 supplies $CO_2$ to acidification vessel 60 with addition to the pumped liquid after pump 66. The $CO_2$ is absorbed in the wash solution in sump 62. Pressure regulator 64 on return line 204 maintains the pressure in acidification vessel 60 to maintain a $CO_2$ partial pressure. As above, the acidified wash solution in this embodiment is provided to the wash column 42 to react with the amines in the reduced $CO_2$ content gas flowing through the wash column 42.

Figure 8:
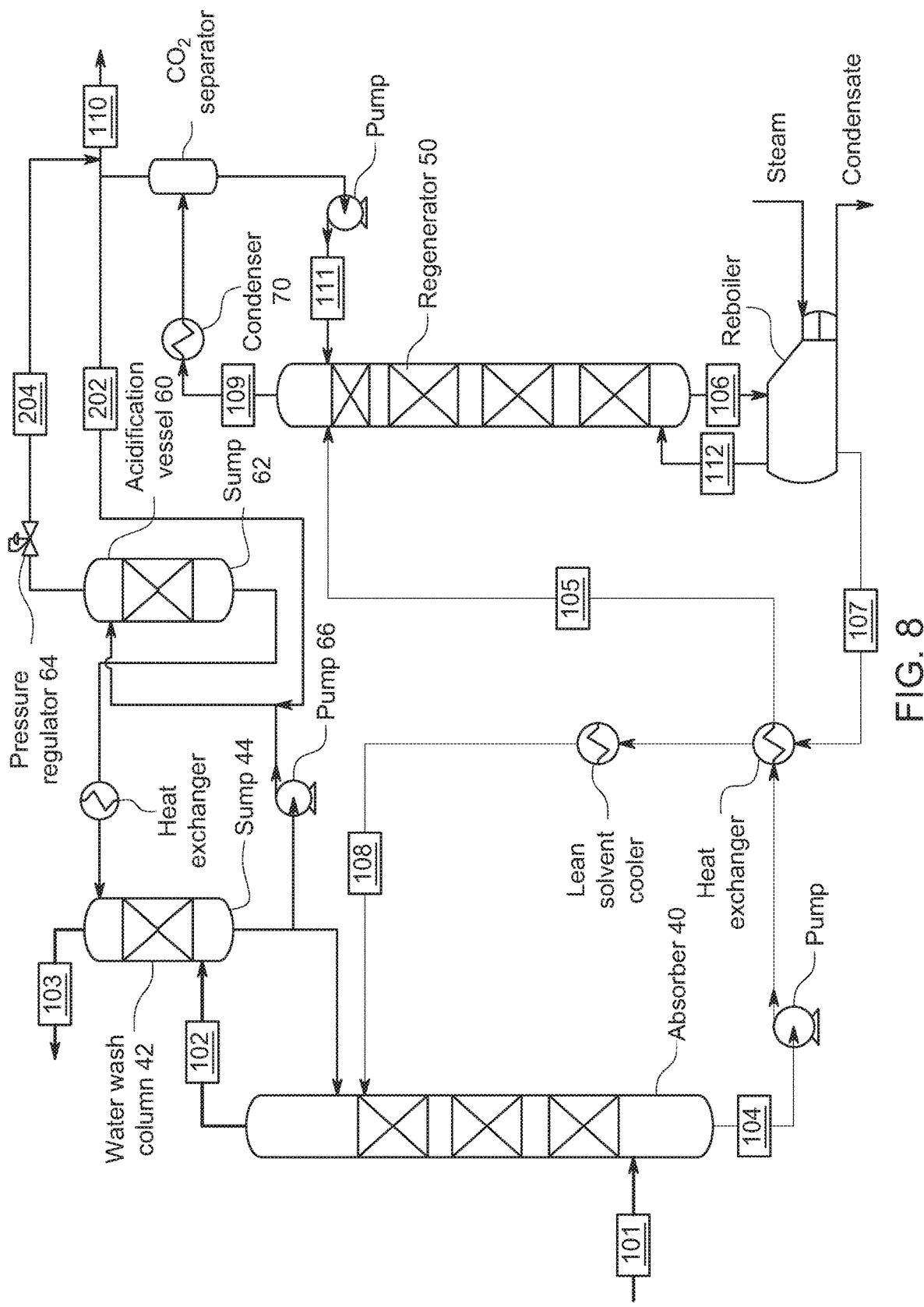
FIG. 8 is a schematic of a further variant of the $CO_2$ capture system of the invention.

FIG. 8 shows an embodiment where the gaseous $CO_2$ from the regenerator is feed to the acidification vessel 60 with addition into the pumped line from pump 66. In FIG. 6, recycled $CO_2$ gas from regenerator 50 can be supplied in the line between pump 66 and the acidification vessel 60. Here, also, pressure regulator 64 maintains $CO_2$ as an over-pressure maintaining the pressure on top of sump 62 in the acidification vessel 60. $CO_2$ absorbed in the wash solution in sump 62 makes an acidified wash solution. As above, the acidified wash solution in this embodiment is provided to the wash column 42 to react with the amines in the reduced $CO_2$ content gas flowing through the wash column 42.

Figure 9:
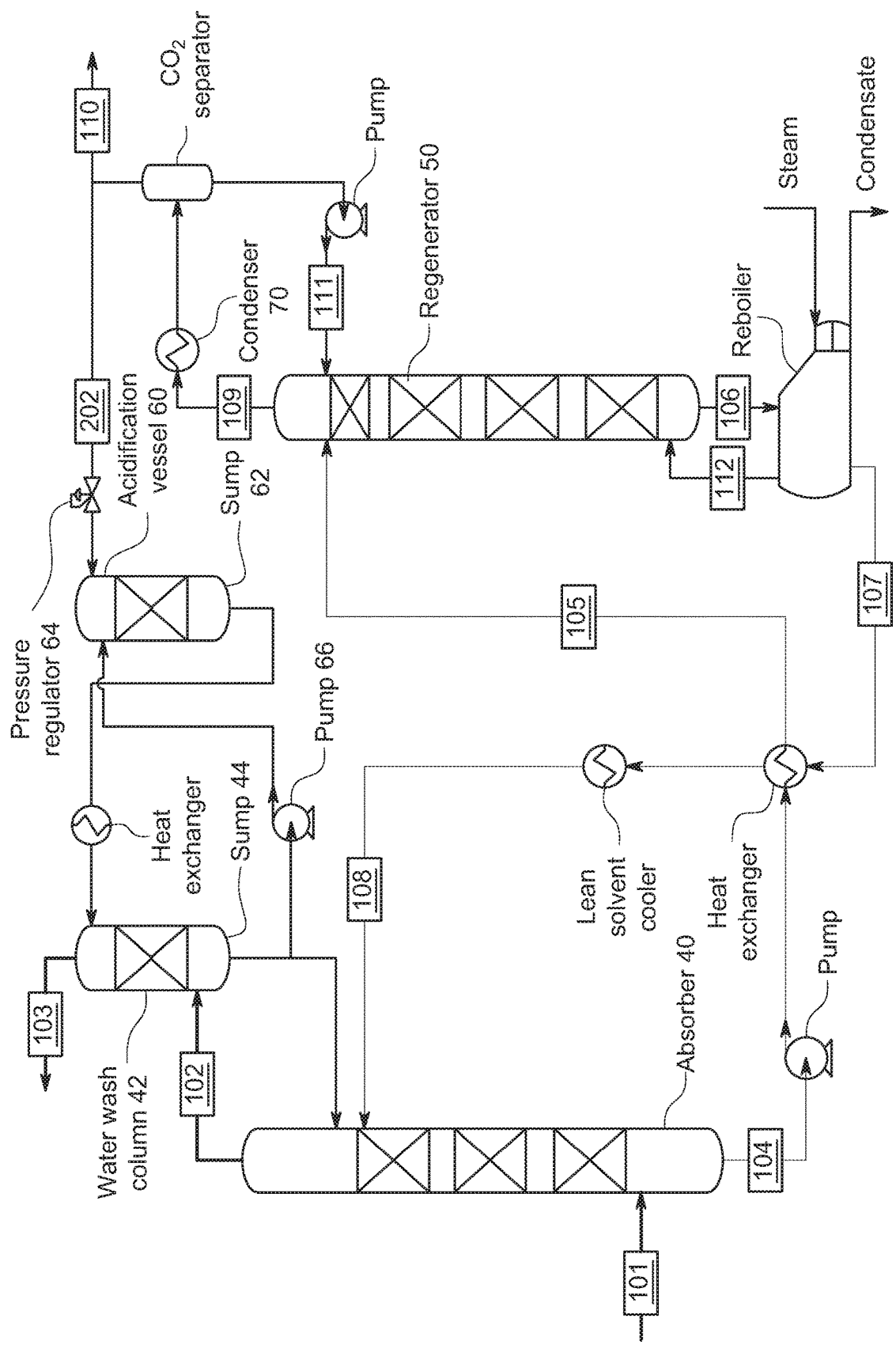
FIG. 9 is a schematic of one more variant of the $CO_2$ capture system of the invention.

FIG. 9 shows an embodiment where the gaseous $CO_2$ from the regenerator is feed to the acidification vessel 60. In FIG. 9, recycled $CO_2$ gas from regenerator 50 is supplied to the acidification vessel 60 by way of pressure regulator 64, which here supplies gaseous $CO_2$ as an over-pressure adding pressure on top of sump 62 in the acidification vessel 60. This embodiment allows the pressure regulator to supply $CO_2$ at the rate it is absorbed in the wash solution as needed to maintain the pressure and forgo recapturing the excess gas not absorbed in the wash solution. $CO_2$ absorbed in the wash solution in sump 62 makes an acidified wash solution. As above, the acidified wash solution in this embodiment is provided to the wash column 42 to react with the amines in the reduced $CO_2$ content gas flowing through the wash column 42.

In FIGS. 5-9, these configurations in one embodiment of the invention can enhance the pH-reduction of the wash water by operating the acidification vessels 60 at higher pressures.

Figure 10:
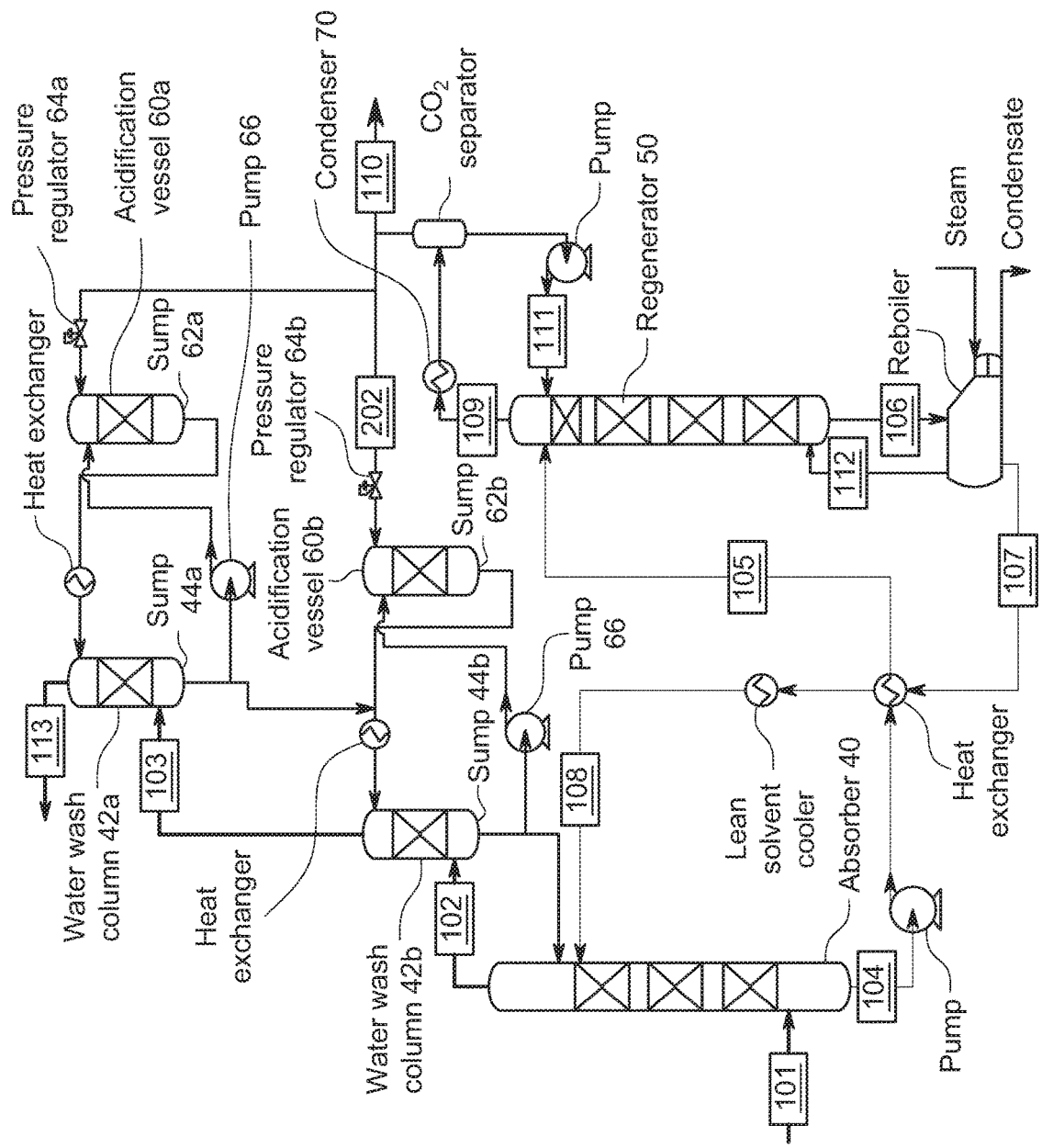
FIG. 10 is a schematic of yet one more variant of the $CO_2$ capture system of the invention.

FIG. 10 shows an embodiment where multiple wash columns 42a, 42b and multiple acidification vessels 60a, 60b are used, and in this case are supplied way of pressure regulators 64a, 64b. $CO_2$ absorbed in the wash solutions in sump 62a and 62b makes separate acidified wash solutions. Here, the acidified wash solutions are provided to wash columns 42a, 42b to react with the amines in the reduced $CO_2$ content gas flowing through the respective wash columns 42a, 42b.

Even though the figures above show a water wash column separate from the absorber, these two units could be implemented as a water-wash integrated into an absorber column. For the case where the $CO_2$ stream mixes with the flue gas stream, the implementation is straightforward. For the case where the $CO_2$ stream used for acidification stays separate, the $CO_2$ addition could be made into a vessel outside of the absorber column, and the liquid transferred between the vessel outside the absorber column and the absorber column. As shown in FIG. 10, multiple wash sections could be used in series with similar acidified wash sections as required to reduce the amine content of the treated gas to the desired level.

In another embodiment, the water wash could also be split into two sections where the water wash is in one section, and the acidification of the wash water occurs in another acidification zone section, and the $CO_2$ stream after the acidification is recaptured. However, the $CO_2$ stream would be added to the wash water after being pumped from the wash column sump. The $CO_2$ gas could contact the wash water in piping leading to a gas-liquid separator tank and maintain a $CO_2$ partial pressure in the gas-liquid separator with the use of a back-pressure regulator. In this case, the $CO_2$ containing gas stream would be separated from the acidified liquid. The acidified liquid could either then be pumped back to the wash column. In one embodiment, the pressure in the tank would push the acidified liquid into the wash column using the level of water in the tank to control on the tank to regulate the flow rate. In another embodiment, the acidified wash solution would be pumped from the acidification vessel.

For the case where the acidification stream is a slipstream of the flue gas as shown in FIG. 7, the gaseous $CO_2$ from outlet 103 of the wash column 42 can be recombined with the flue gas and fed to the absorber. In the case where the acidification stream is a pure $CO_2$ stream as shown in FIG. 8, the stream can be captured and combined with the $CO_2$ stream for compression.

In one embodiment, similar to the one just described, the water wash could also be split into two sections where the water wash is in one section, and the acidification of the wash water occurs in another acidification vessel, and the $CO_2$ stream for acidification is only fed at the rate that it is absorbed into the wash water as shown in FIG. 9. The $CO_2$ stream could be fed to the gas-liquid separator tank with a feed regulator to maintain the pressure. The $CO_2$ could contact the wash water in the gas-liquid separator tank with a controlled $CO_2$ partial pressure. The acidified liquid could either then be pumped back to the wash column or use the pressure in the tank to push it into the wash column with level control on the tank to regulate the flow rate.

For the case where the acidification stream is a slipstream of the flue gas, the concentration of species that do not absorb in the wash water would build over time, so it would need to be steadily or intermittently purged and it could be recombined with the flue gas and fed to the absorber. In the case where it is a pure $CO_2$ stream, the stream would not need to be recaptured and only purged occasionally if impurities in the stream built up. This configuration could also enhance the pH-reduction of the wash water by operating the acidification section at higher pressures.

In one embodiment of the invention, the acidification of the water wash could also be achieved by using the water from a stripper condenser, which should already be acidified from the $CO_2$ scrubbing operation. A stripper condenser is a unit such as the condenser 70 shown in FIGS. 6-10 which condenses $H_2O$ from the $CO_2$ gas exiting the regenerator 50. Water condensed from a $CO_2$ compression process could also serve as another potential source of $CO_2$ acidified water. Additionally, other sources of carbonic acid could also be added to the wash water to elicit the same effect.

One advantage of using $CO_2$ for acidification of the water wash is that the wash water with the solvent scrubbed out of the treated flue gas, can now be returned to the process. In a traditional acid wash, the solvent which now has the neutralized salts cannot be recycled back and resulting in added waste treatment cost and solvent loss. Hence, the inventive process can help reduce solvent losses and thereby the operating costs.

Use of the $CO_2$ as the acidification agent for the water wash can also be followed by a traditional acid wash step if so desired. Even in this case, the of the $CO_2$-acidified water wash will still result in reducing the amount of acid required for the traditional acid wash and the overall solvent losses.

Use of a separated water wash also allows for re-capture of the $CO_2$ stream used for acidification, thus obviating the need for either enhanced $CO_2$ capture to meet $CO_2$ capture targets or reduced $CO_2$ capture.

Accordingly, in view of the results described above, there are numerous advantages of using a $CO_2$ stream for emissions control:

Efficient recovery of the solvent while minimizing the solvent loss that occurs with use of a traditional acid wash. This results in lower operating costs.

It also lowers the waste generated from the acid wash or could eliminate the need for an acid wash entirely, again lowering waste treatment costs.

In some cases, this may obviate the need for a traditional acid wash column, resulting in lowered capital expenditure and investment.

Method for Reducing Amine Emission

Figure 11:
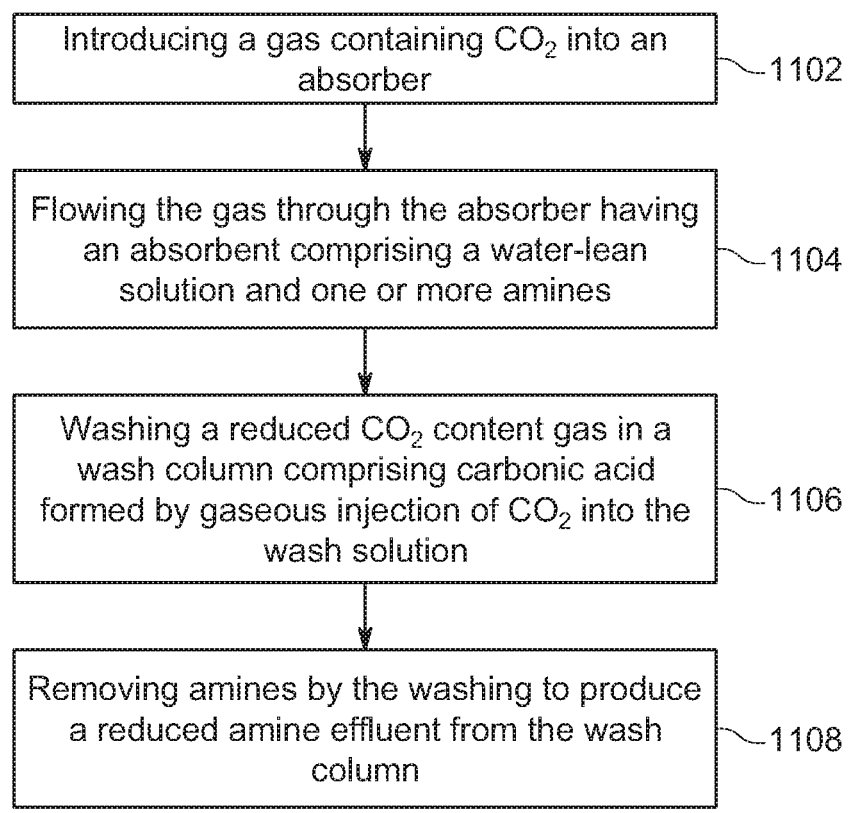
FIG. 11 is a schematic of a flow chart of the present invention detailing a method for reducing amine emission.

In one embodiment of the invention, a method for reducing emission of amines to the atmosphere is provided. In FIG. 11, this method is illustrated. At step 1102, a gas containing $CO_2$ is introduced into an absorber. At 1104, the gas is flowed through an absorbent optionally comprising a water-lean solution having less than 50% water and one or more amines. With this process, the absorbent captures the $CO_2$ and forms a reduced $CO_2$ content gas having a baseline $CO_2$ content. At 1106, the reduced $CO_2$ content gas is washed in a wash column with a wash solution comprising carbonic acid formed by addition of gaseous $CO_2$ into the wash solution, At 1108, the washing a) removes the amines from the reduced $CO_2$ content gas and b) produces a reduced amine content gas from the wash column.

The process shown in FIG. 11 can be performed with any of the process steps detailed below and any combination of those process steps.

For example, in one embodiment, the addition of gaseous $CO_2$ into the wash solution comprises adding the gaseous $CO_2$ into a sump of the wash column from which the wash solution is sent to a top of the wash column.

In one embodiment, the addition of gaseous $CO_2$ into the wash solution comprises adding the gaseous $CO_2$ into an acidification vessel from which the wash solution is sent to a top of the wash column.

In one embodiment, the addition of gaseous $CO_2$ into the wash solution comprises adding the gaseous $CO_2$ into the wash solution after the solution is removed from a sump of the wash column and sent to an acidification vessel from which the wash solution is sent to a top of the wash column.

In one embodiment, a constant pressure is maintained in the acidification vessel via a regulated $CO_2$ feed line.

In one embodiment, the addition of gaseous $CO_2$ into the wash solution comprises adding the gaseous $CO_2$ into a wash return line and then removing in a gas separator excess $CO_2$ that is not absorbed in the water. In one embodiment, the addition of gaseous $CO_2$ into the wash solution comprises adding the gaseous $CO_2$ into an acidification vessel at a regulated pressure from which the wash solution is sent to the top of the wash column. In one embodiment, the gaseous $CO_2$ added but not absorbed by the acidification vessel is captured and not released to vent or ambient. In one embodiment, the addition of gaseous $CO_2$ into the wash solution increases the baseline $CO_2$ content exiting the absorber by only 0.1-10% of the flue gas $CO_2$ content. In one embodiment, the addition of gaseous $CO_2$ into the wash solution results in a reduction of amine content in the reduced amine content gas exiting from the wash column as the pH of the wash solution decreases. In one embodiment, the pH of the wash solution is maintained between 6.0-8.0 during the washing.

In one embodiment, the baseline $CO_2$ content of the reduced $CO_2$ content gas exiting the absorber ranges from 1 to 10% of total gas exiting the absorber, a pH range of the wash solution is maintained between 6 to 8, an amine concentration in the reduced $CO_2$ content gas prior to washing ranges from 20 to 2000 ppm, and the reduced amine content of the reduced amine content gas exiting from the wash column is reduced to a range from 1 to 50 ppm.

In one embodiment, upon the addition of gaseous $CO_2$ into the wash solution, an increase of the $CO_2$ content in the treated gas leaving the wash column is no more than 5% of the flue gas $CO_2$ content. In one embodiment, the pH range is maintained in the wash solution ranges from 6.5 to 7.5, or ranges from 6 to 7.5, or ranges from 7.0 to 8.0.

In one embodiment, a concentration of the baseline $CO_2$ content in the reduced $CO_2$ content gas exiting the absorber prior to the washing ranges from 2 to 5% or ranges from 1 to 2% or ranges from 0.5 to 2% or ranges from 0.1 to 2%.

In one embodiment, an amine concentration in the reduced $CO_2$ content gas exiting the absorber prior to washing ranges from 20 to 2000 ppm or ranges from 30 to 3000 ppm, or ranges from 5 to 500 ppm.

In one embodiment, an amine content in the reduced amine content gas exiting the wash column is reduced by the washing to a range from 0 to 20 ppm or to a range from 1 to 20 ppm or to a range from 5 to 50 ppm or to a range from 10 to 100 ppm to a range from 20 to 200 ppm.

In one embodiment, the water-lean solution of one or more amines comprises less than 40 wt. % water or less than 30 wt. % water or less than 20 wt. % water.

In one embodiment, the amine is selected from the group consisting of: a primary amine, a secondary amine, a diamine, a triamine, a tetraamine, a pentamine, a cyclic amine, a cyclic diamine, an amine oligomer, a polyamine, an alkanolamine, and mixtures thereof. In one embodiment, the amine has a pKa of about 8 to about 15. In one embodiment, the amine is selected from the group consisting of primary amines, secondary amines, diamines, triamines, tetraamines, pentamines, cyclic amines, cyclic diamines, amine oligomers, polyamines, alcoholamines, guanidines, amidines, and mixtures thereof. Certain amines include, but are not limited to, 1,4-diazabicyclo-undec-7-ene ("DBU"); 1,4-diazabicyclo-2,2,2-octane; piperazine ("PZ"); triethylamine ("TEA"); 1,1,3,3-tetramethylguanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethylamine; 3,5-difluorobenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof.

In one embodiment, the addition of the gaseous $CO_2$ comprises introducing into the wash column a flow of at least one of $CO_2$, $CO_2$ and $N_2$, $CO_2$ and $O2$ and $N_2$, a flue gas, a syngas, a natural gas, and $CO_2$ captured from the absorbent and later released.

In one embodiment, the addition of the gaseous $CO_2$ into the wash column increases a partial pressure of $CO_2$ from the baseline $CO_2$ partial pressure to 0.0125 to 0.1 MPa for respective $CO_2$ concentrations from 12.5% to 100%.

In one embodiment, the absorbent comprises an alkaline absorbent such as for example aqueous ammonia, aqueous $K_2CO_3$, aqueous $Na_2CO_3$, aqueous NaOH, and/or aqueous KOH. In one embodiment, the alkaline absorbent may include an amine acting for example as an activator. $K_2CO_3$, $Na_2CO_3$, NaOH and KOH are inorganic absorbents which do not have a vapor pressure and hence would have no vapor emissions. However, if these absorbents are used in the present invention with amines (such as those noted herein), the emissions from the amines would be reduced using the methods of this invention.

In one embodiment, there is a regenerator, regenerating (or recycling) $CO_2$ from the amine. In one embodiment, the $CO_2$ that comes out of the regenerator is recycled. In one embodiment, any of the $CO_2$ that does not absorb into the wash solution after the addition of the regenerated $CO_2$ into the wash solution is captured. In one embodiment, the $CO_2$ that is captured can be used for the addition of the gaseous $CO_2$ into the wash solution.

Computer-Assisted Control

In one embodiment of the invention, there is provided a computer implemented system including a central processing unit (CPU) having a storage medium on which is provided a database of solvents and flow rate conditions, including the tabular data given above.

The computer system in one embodiment controls one of systems described above for reducing emission of amines to the atmosphere, by executing the method described in FIG. 11 and any of the processes described above.

Figure 12:
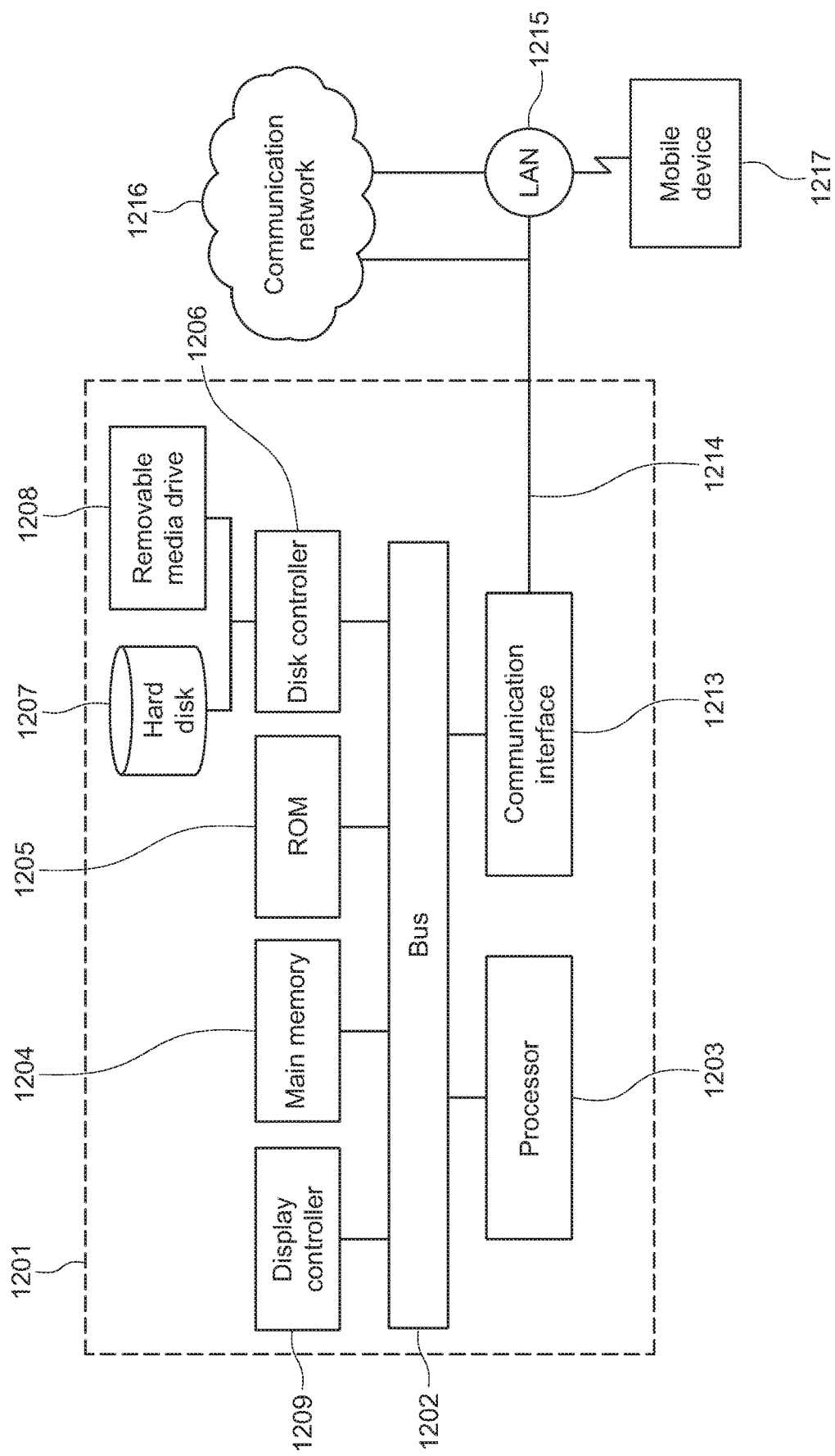
FIG. 12 is a schematic of a computer system for implementing various embodiments of the invention.

FIG. 12 illustrates a computer system 1201 for implementing various embodiments of the invention. The computer system 1201 may be used as the computer system to perform any or all of the functions described above controlling the $CO_2$ capture systems described above. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable read only memory (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display, such as a cathode ray tube (CRT), for displaying information to a user monitoring the $CO_2$ capture systems described above. The computer system includes input devices, for interacting with a computer user and providing information to the processor 1203. The pointing device, for example, may be a mouse, a trackball, or a pointing stick for communicating direction information and command selections to the processor 1203 and for controlling cursor movement on the display.

The computer system 1201 performs a portion or all of the processing steps (or functions) of this invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

The computer code devices of the invention may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media may also take the form of acoustic or light waves, such as those generated during radio wave and infrared data communications.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave-based signals. The computer system 1201 can transmit and receive data, including program code, process data and status through the network(s) 1215 and 1216, the network link 1214, and the communication interface 1213 to other processors operating different $CO_2$ capture systems or to plant supervising computer.

Statements of the Invention

The following numbered statements of the invention describe various (non-limiting) embodiments of the invention:

Statement 1. A method for reducing emission of amines to the atmosphere, the method comprising:

introducing a gas containing $CO_2$ into an absorber;

flowing the gas through the absorber having an absorbent comprising a water-lean solution having less than 50% water and one or more amines, the absorbent capturing the $CO_2$ and forming a reduced $CO_2$ content gas having a baseline $CO_2$ content; and washing the reduced $CO_2$ content gas in a wash column with a wash solution comprising carbonic acid formed by addition of gaseous $CO_2$ into the wash solution, wherein the washing a) removes the amines from the reduced $CO_2$ content gas and b) produces a reduced amine content gas exiting from the wash column.

Statement 2. The method of statement 1, wherein the addition of gaseous $CO_2$ into the wash solution comprises adding the gaseous $CO_2$ into a sump of the wash column from which the wash solution is sent to a top of the wash column.

Statement 3. The method of statement 1, wherein the addition of gaseous $CO_2$ into the wash solution comprises adding the gaseous $CO_2$ into an acidification vessel from which the wash solution is sent to a top of the wash column.

Statement 4. The method of statement 1, wherein the addition of gaseous $CO_2$ into the wash solution comprises adding the gaseous $CO_2$ into the wash solution after the solution is removed from a sump of the wash column and sent to an acidification vessel from which the wash solution is sent to a top of the wash column.

Statement 5. The method of statement 4, further comprising maintaining constant pressure in the acidification vessel via a regulated $CO_2$ feed line.

Statement 6. The method of statement 1, wherein the addition of gaseous $CO_2$ into the wash solution comprises adding the gaseous $CO_2$ into a wash return line and then removing in a gas separator excess $CO_2$ that is not absorbed in the water.

Statement 7. The method of statement 1, wherein the addition of gaseous $CO_2$ into the wash solution comprises adding the gaseous $CO_2$ into an acidification vessel at a regulated pressure from which the wash solution is sent to the top of the wash column.

Statement 8. The method of statement 7, wherein the gaseous $CO_2$ added but not absorbed by the acidification vessel is captured and not released to vent or ambient.

Statement 9. The method of statement 1, wherein the addition of gaseous $CO_2$ into the wash solution increases the baseline $CO_2$ content exiting the absorber by only 0.1-10% of the flue gas $CO_2$ content.

Statement 10. The method of statement 1, wherein the addition of gaseous $CO_2$ into the wash solution results in a reduction of amine content in the reduced amine content gas exiting from the wash column as the pH of the wash solution decreases.

Statement 11. The method of statement 10, wherein the pH of the wash solution is maintained between 6.0-8.0 during the washing.

Statement 12. The method of statement 1, wherein the baseline $CO_2$ content of the reduced $CO_2$ content gas exiting the absorber ranges from 1 to 10% of total gas exiting the absorber, a pH range of the wash solution is maintained between 6 to 8, an amine concentration in the reduced $CO_2$ content gas prior to washing ranges from 20 to 2000 ppm, and the reduced amine content of the reduced amine content gas exiting from the wash column is reduced to a range from 1 to 50 ppm.

Statement 13. The method of statement 12, wherein, upon the addition of gaseous $CO_2$ into the wash solution, an increase of the $CO_2$ content in the wash solution is no more than 5% of the baseline $CO_2$ content.

Statement 14. The method of statement 12, wherein the pH range is maintained in the wash solution ranges from 6.5 to 7.5.

Statement 15. The method of statement 12, wherein the pH range is maintained in the wash solution ranges from 6 to 7.5.

Statement 16. The method of statement 12, wherein the pH range maintained in the wash solution ranges from 7.0 to 8.0.

Statement 17. The method of statement 1, wherein a concentration of the baseline $CO_2$ content in the reduced $CO_2$ content gas exiting the absorber prior to the washing ranges from 2 to 5%.

Statement 18. The method of statement 1, wherein a concentration of the baseline $CO_2$ content in the reduced $CO_2$ content gas exiting the absorber prior to the washing ranges from 1 to 2%.

Statement 19. The method of statement 1, wherein a concentration of the baseline $CO_2$ content in the reduced $CO_2$ content gas exiting the absorber prior to the washing ranges from 0.5 to 2%.

Statement 20. The method of statement 1, wherein a concentration of the baseline $CO_2$ content in the reduced $CO_2$ content gas exiting the absorber prior to the washing ranges from 0.1 to 2%.

Statement 21. The method of statement 1, wherein an amine concentration in the reduced $CO_2$ content gas exiting the absorber prior to washing ranges from 20 to 2000 ppm.

Statement 22. The method of statement 1, wherein an amine concentration in the reduced $CO_2$ content gas exiting the absorber prior to washing ranges from 30 to 3000 ppm.

Statement 23. The method of statement 1, wherein an amine concentration in the reduced $CO_2$ content gas exiting the absorber prior to washing ranges from 5 to 500 ppm.

Statement 24. The method of statement 1, wherein an amine content in the reduced amine content gas exiting the wash column is reduced by the washing to a range from 0 to 20 ppm.

Statement 25. The method of statement 1, wherein an amine content in the reduced amine content gas exiting the wash column is reduced by the washing to a range from 5 to 50 ppm.

Statement 26. The method of statement 1, wherein an amine content in the reduced amine content gas exiting the wash column is reduced by the washing to a range from 10 to 100 ppm.

Statement 27. The method of statement 1, wherein an amine content in the reduced amine content gas exiting the wash column is reduced by the washing to a range from 20 to 200 ppm.

Statement 28. The method of statement 1, wherein the water-lean solution of one or more amines comprises less than 40 wt. % water.

Statement 29. The method of statement 1, wherein the water-lean solution of one or more amines comprises less than 30 wt. % water.

Statement 30. The method of statement 1, wherein the water-lean solution of one or more amines comprises less than 20 wt. % water.

Statement 31. The method of statement 1, wherein the amine is selected from the group consisting of: a primary amine, a secondary amine, a diamine, a triamine, a tetraamine, a pentamine, a cyclic amine, a cyclic diamine, an amine oligomer, a polyamine, an alkanolamine, a guanidine, an amidine, and mixtures thereof.

Statement 32. The method of statement 1, wherein the amine has a pKa of about 8 to about 15.

Statement 33. The method of statement 1, wherein the amine is selected from the group consisting of primary amines, secondary amines, diamines, triamines, tetraamines, pentamines, cyclic amines, cyclic diamines, amine oligomers, polyamines, alcoholamines, guanidines, amidines, and mixtures thereof. Certain amines include, but are not limited to, 1,4-diazabicyclo-undec-7-ene ("DBU"); 1,4-diazabicyclo-2,2,2-octane; piperazine ("PZ"); triethylamine ("TEA"); 1,1,3,3-tetramethylguanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethylamine; 3,5-difluorobenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof.

Statement 34. The method of statement 1, wherein the addition of the gaseous $CO_2$ comprises introducing into the wash column a flow of at least one of $CO_2$, $CO_2$ and $N_2$, $CO_2$ and $O_2$ and $N_2$, a flue gas, a syngas, a natural gas, and $CO_2$ captured from the absorbent and later released.

Statement 35. The method of statement 1, wherein the addition of the gaseous $CO_2$ into the wash column increases a partial pressure of $CO_2$ from the baseline $CO_2$ partial pressure to 0.0125 to 0.1 MPa for respective $CO_2$ concentrations from 12.5% to 100%.

Statement 36. The method of statement 1, further comprising:
in a regenerator, regenerating $CO_2$ from the amine.

Statement 37. The method of statement 36, further comprising:
recycling the $CO_2$ that comes out of the regenerator.

Statement 38. The method of statement 37, further comprising:
capturing $CO_2$ that does not absorb into the wash solution after the addition of the regenerated $CO_2$ into the wash solution.

Statement 39. The method of statement 1, further comprising:
using regenerated $CO_2$ for the addition of the gaseous $CO_2$ into the wash solution.

Statement 40. The method of statement 1, wherein the absorbent comprises an aqueous alkaline absorbent.

Statement 41. A system for reducing emission of amines to the atmosphere, the system comprising:
a gas feed configured to supply gas containing $CO_2$;
an absorber configured to receive the gas containing $CO_2$;
an absorbent supply for provision of an absorbent to the absorber, the absorbent comprising a water-lean solution having less than 50% water and one or more amines, wherein the absorbent is configured to capture the $CO_2$ and form a reduced $CO_2$ content gas having a baseline $CO_2$ content;
a wash column configured to wash with a wash solution the reduced $CO_2$ content gas flowing therethrough;
a gaseous $CO_2$ supply of the wash column for provision of gaseous $CO_2$ into the wash solution; and
the wash solution comprising carbonic acid formed by addition of the gaseous $CO_2$ into the wash solution,
wherein washing of the reduced $CO_2$ content gas a) removes the amines from the reduced $CO_2$ content gas and b) produces a reduced amine content gas exiting from the wash column.

Statement 42. The system of statement 41, wherein the wash column comprises a sump from which the wash solution is pumped to the top of the wash column.

Statement 43. The system of statement 41, wherein the gaseous $CO_2$ supply adds the gaseous $CO_2$ into the wash solution in the sump.

Statement 44. The system of statement 41, further comprising an acidification vessel from which the wash solution is pumped to a top of the wash column.

Statement 45. The system of statement 44, wherein the gaseous $CO_2$ supply adds the gaseous $CO_2$ into the wash solution in the acidification vessel.

Statement 46. The system of statement 41, wherein the gaseous $CO_2$ supply adds the gaseous $CO_2$ into the acidification vessel at a rate that the $CO_2$ is absorbed in the wash solution.

Statement 47. The system of statement 41, wherein the gaseous $CO_2$ supply adds the gaseous $CO_2$ into the wash solution after removal from the wash column sump.

Statement 48. The system of statement 41, further comprising a regenerator configured to regenerate the absorbent.

Statement 49. The system of statement 48, wherein the regenerator comprises a $CO_2$ outlet.

Statement 50. The system of statement 49, wherein the $CO_2$ outlet is coupled to the gaseous $CO_2$ supply of the wash column.

Statement 51. The system of statement 41, wherein the absorber comprises a $CO_2$ tap for tapping into the gas feed.

Statement 52. The system of statement 51, wherein the $CO_2$ tap is coupled to the gaseous $CO_2$ supply of the wash column.

Statement 53. The system of statement 41, further comprising an acidification vessel connected to the wash column for acidification of the wash solution pumped from the wash column and production of an acidified wash solution.

Statement 54. The system of statement 53, wherein the acidified wash solution is provided to the wash column to react with the amines in the reduced $CO_2$ content gas flowing through the wash column.

Numerous modifications and variations of the invention are possible in light of the above teachings. It is therefore to be understood that within the scope of the appended claims, the invention may be practiced otherwise than as specifically described herein.

The invention claimed is:

1. An integrated method for reducing emission of amines to the atmosphere, the method comprising:
introducing a gas containing $CO_2$ into an absorber;
flowing the gas through the absorber having an absorbent comprising a water-lean solution having less than 50% water and one or more amines, the absorbent capturing the $CO_2$ and forming a reduced $CO_2$ content gas having a baseline $CO_2$ content; and
washing the reduced $CO_2$ content gas in a wash column with a wash solution comprising carbonic acid formed by addition of gaseous $CO_2$ into the wash solution, wherein the carbonic acid is formed directly from $CO_2$ in a syngas, a natural gas, a coal flue gas or a natural gas flue gas, wherein the washing a) removes the amines from the reduced $CO_2$ content gas and b) produces a reduced amine content gas exiting from the wash column.

2. The method of claim 1, wherein the addition of gaseous $CO_2$ into the wash solution comprises adding the gaseous $CO_2$ into a sump of the wash column from which the wash solution is sent to a top of the wash column.

3. The method of claim 1, wherein the addition of gaseous $CO_2$ into the wash solution comprises adding the gaseous $CO_2$ into the wash solution after the solution is removed from a sump of the wash column and sent to an acidification vessel to form a carbonated wash solution from which the carbonated wash solution is sent to a top of the wash column.

4. The method of claim 1, wherein the addition of gaseous $CO_2$ into the wash solution comprises adding the gaseous $CO_2$ into an acidification vessel at a regulated pressure from which the wash solution is sent to the top of the wash column.

5. The method of claim 1, wherein the addition of gaseous $CO_2$ into the wash solution increases the baseline $CO_2$ content exiting the absorber by only 0.1-10% of the flue gas $CO_2$ content.

6. The method of claim 1, wherein the addition of gaseous $CO_2$ into the wash solution results in a reduction of amine content in the reduced amine content gas exiting from the wash column as the pH of the wash solution decreases.

7. The method of claim 1, wherein the pH of the wash solution is maintained between 6.0-8.0 during the washing.

8. The method of claim 1, wherein
the baseline $CO_2$ content of the reduced $CO_2$ content gas exiting the absorber ranges from 1 to 10% of total gas exiting the absorber,
a pH range of the wash solution is maintained between 6 to 8,
an amine concentration in the reduced $CO_2$ content gas prior to washing ranges from 20 to 2000 ppm, and
the reduced amine content of the reduced amine content gas exiting from the wash column is reduced to a range from 1 to 50 ppm.

9. The method of claim 8, wherein, upon the addition of gaseous $CO_2$ into the wash solution, an increase of the $CO_2$ content in the wash solution is no more than 5% of the baseline $CO_2$ content.

10. The method of claim 1, wherein an amine concentration in the reduced $CO_2$ content gas exiting the absorber prior to washing ranges from 20 to 2000 ppm.

11. The method of claim 1, wherein the water-lean solution of one or more amines comprises less than 40 wt. % water.

12. The method of claim 1, wherein the amine is selected from the group consisting of primary amines, secondary amines, diamines, triamines, tetraamines, pentamines, cyclic amines, cyclic diamines, amine oligomers, polyamines, alcoholamines, guanidines, amidines, and mixtures thereof.

13. The method of claim 12, wherein the amine is selected from the group consisting of 1,4-diazabicyclo-undec-7-ene ("DBU"); 1,4-diazabicyclo-2,2,2-octane; piperazine ("PZ"); triethylamine ("TEA"); 1,1,3,3-tetramethylguanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethylamine; 3,5-difluorobenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof.

14. The method of claim 1, wherein the addition of the gaseous $CO_2$ comprises introducing into the wash column a flow of at least one of $CO_2$, $CO_2$ and $N_2$, $CO_2$ and $O_2$ and $N_2$, a flue gas, a syngas, a natural gas, and $CO_2$ captured from the absorbent and later released.

15. The method of claim 1, wherein the wash column has an initial $CO_2$ partial pressure of 0.0015 MPa and the addition of the gaseous $CO_2$ into the wash column increases a partial pressure of $CO_2$ to 0.0125 to 0.1 MPa for respective $CO_2$ concentrations from 12.5% to 100%.

16. The method of claim 1, further comprising:
in a regenerator, regenerating $CO_2$ from the amine.

17. The method of claim 16, further comprising:
recycling the $CO_2$ that comes out of the regenerator.

18. The method of claim 1, further comprising:
capturing $CO_2$ that does not absorb into the wash solution after the addition of the regenerated $CO_2$ into the wash solution.

19. The method of claim 1, further comprising:
using regenerated $CO_2$ for the addition of the gaseous $CO_2$ into the wash solution.

20. The method of claim 1, wherein the absorbent comprises an aqueous alkaline absorbent.

21. The method of claim 1, wherein the carbonic acid is formed from $CO_2$ in a coal flue gas.

22. The method of claim 1, wherein the carbonic acid is formed from $CO_2$ in a natural gas flue gas.

23. The method of claim 1, wherein the $CO_2$ in the syngas, the natural gas, the coal flue gas or the natural gas flue gas is concentrated so as to generate a higher $CO_2$ partial pressure.

24. The method of claim 1, wherein the $CO_2$ in the syngas, the natural gas, the coal flue gas or the natural gas flue gas is pressurized so as to generate a higher $CO_2$ partial pressure in the wash solution.

* * * * *